United States Patent
Pu et al.

(10) Patent No.: US 12,425,849 B2
(45) Date of Patent: Sep. 23, 2025

(54) METHOD AND APPARATUS FOR OBTAINING KEY, USER EQUIPMENT, AND NETWORK SIDE DEVICE

(71) Applicant: VIVO MOBILE COMMUNICATION CO., LTD., Dongguan (CN)

(72) Inventors: Wenjuan Pu, Dongguan (CN); Xiaodong Yang, Dongguan (CN); Wei Bao, Dongguan (CN); Xuanbing Liu, Dongguan (CN); Fei Qin, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 387 days.

(21) Appl. No.: 18/058,567

(22) Filed: Nov. 23, 2022

(65) Prior Publication Data
US 2023/0079410 A1 Mar. 16, 2023

Related U.S. Application Data

(63) Continuation of application No. PCT/CN2021/096533, filed on May 27, 2021.

(30) Foreign Application Priority Data

May 27, 2020 (CN) .......................... 202010463814.4

(51) Int. Cl.
*H04W 12/03* (2021.01)
*H04W 12/0471* (2021.01)

(52) U.S. Cl.
CPC ....... *H04W 12/0471* (2021.01); *H04W 12/03* (2021.01)

(58) Field of Classification Search
CPC ............. H04W 12/0471; H04W 12/03; H04W 12/041; H04W 12/106
See application file for complete search history.

(56) References Cited

U.S. PATENT DOCUMENTS

| 10,701,687 | B2 | 6/2020 | Liu et al. |
| 10,855,461 | B2 | 12/2020 | Chang et al. |
| 2013/0152178 | A1 | 6/2013 | King et al. |
| 2015/0163202 | A1 | 6/2015 | Nair et al. |
| 2016/0127903 | A1 | 5/2016 | Lee et al. |
| 2016/0315923 | A1* | 10/2016 | Riscombe-Burton ........................ H04L 63/0442 |
| 2019/0014089 | A1 | 1/2019 | Wei |
| 2019/0021123 | A1 | 1/2019 | Ma et al. |
| 2020/0037165 | A1 | 1/2020 | Kunz et al. |

FOREIGN PATENT DOCUMENTS

| CN | 101998392 A | 3/2011 |
| CN | 108701195 A | 10/2018 |
| CN | 108702740 A | 10/2018 |
| CN | 110072233 A | 7/2019 |
| CN | 110769418 A | 2/2020 |

(Continued)

*Primary Examiner* — Chuong A Ngo
(74) *Attorney, Agent, or Firm* — The Webb Law Firm (57) ABSTRACT

A method for obtaining a key includes sending, by a first UE, first key information to a network side device, where the first key information is used for indicating a first key of a second UE, and the first key is used for performing encryption and/or integrity protection on data in communication between the second UE and the network side device.

14 Claims, 4 Drawing Sheets

(56) References Cited

FOREIGN PATENT DOCUMENTS

| | | | |
|---|---|---|---|
| CN | 110830993 | A | 2/2020 |
| JP | 2016219955 | A | 12/2016 |
| JP | 2018502529 | A | 1/2018 |
| WO | 2017132962 | A1 | 8/2017 |

* cited by examiner

METHOD AND APPARATUS FOR OBTAINING KEY, USER EQUIPMENT, AND NETWORK SIDE DEVICE

CROSS-REFERENCE TO RELATED APPLICATIONS

This application is a Bypass Continuation Application of International Application No. PCT/CN2021/096533 filed May 27, 2021, and claims priority to Chinese Patent Application No. 202010463814.4 filed May 27, 2020, the disclosures of which are hereby incorporated by reference in their entirety.

BACKGROUND OF THE INVENTION

Field of the Invention

The present disclosure belongs to the field of communication technologies, and in particular, to a method and an apparatus for obtaining a key, user equipment, and a network side device.

Description of Related Art

Currently, security functions, for example, security operations such as encryption/decryption and integrity protection/checking of transmitted data based on a security key, may be enabled or activated during data transmission between user equipment (UE) and a network side device, thereby improving the security of data transmission between the UE and the network side device. Security keys are usually not transmitted over an air interface for security reasons and need to be derived by the network side device and the UE based on locally stored information.

However, since some UEs cannot derive security keys directly (for example, due to the lack of a SIM card, or UE capability not supporting calculation) or cannot rely on themselves to derive the same security key at the network side device, the security of data between the UEs and the network side device fails to be protected.

In this way, when these UEs need to transmit data with the network side device, the transmission security of such data cannot be ensured, resulting in low reliability of the data transmission between the UEs and the network side device.

SUMMARY OF THE INVENTION

According to a first aspect, a method for obtaining a key is provided, applied to first UE, the method including: sending a first key information to a network side device, where the first key information is used for indicating a first key of a second UE, and the first key is used for performing encryption and/or integrity protection on data in communication between the second UE and the network side device.

According to a second aspect, an apparatus for obtaining a key is provided, the apparatus including: a sending module, configured to send first key information to a network side device, where the first key information is used for indicating a first key of second user equipment UE, and the first key is used for performing encryption and/or integrity protection on data in communication between the second UE and the network side device.

According to a third aspect, a method for obtaining a key is provided, applied to second UE, the method including: sending a proxy request to first UE; if a proxy response fed back by the first UE is received, sending target key information to the first UE, the proxy request is used for requesting proxy for a security process of the second UE; the proxy response is used for instructing the first UE to accept proxy for the security process of the second UE; and the target key information is used for indicating a first key; and the first key is used for performing encryption and/or integrity protection on data in communication between the second UE and the network side device.

According to a fourth aspect, an apparatus for obtaining a key is provided, the apparatus including: a sending module, configured to send a proxy request to first UE, where the sending module is further configured to: if a proxy response fed back by the first UE is received, send target key information to the first UE; the proxy request is used for requesting proxy for a security process of the second UE; the proxy response is used for instructing the first UE to accept proxy for the security process of the second UE; and the target key information is used for indicating a first key; and the first key is used for performing encryption and/or integrity protection on data in communication between the second UE and the network side device.

According to a fifth aspect, a method for obtaining a key is provided, applied to a network side device, the method including: receiving first key information from the first UE, where the first key information is used for indicating a first key of the second UE; and the first key of the second UE is used for performing encryption and/or integrity protection on data in communication between the second UE and the network side device.

According to a sixth aspect, an apparatus for obtaining a key is provided, the apparatus including: a receiving module, configured to receive first key information from the first UE, where the first key information is used for indicating a first key of the second UE; and the first key of the second UE is used for performing encryption and/or integrity protection on data in communication between the second UE and the network side device.

According to a seventh aspect, UE is provided, the UE including a processor, a memory, and a program or an instruction stored in the memory and executable on the processor, where the program or instruction, when being executed by the processor, implements the steps of the method according to the first aspect or the third aspect.

According to an eighth aspect, a network side device is provided, the network side device including a processor, a memory, and a program or an instruction stored in the memory and executable on the processor, where the program or instruction, when being executed by the processor, implements the steps of the method according to the fifth aspect.

According to a ninth aspect, a non-transitory readable storage medium is provided, the non-transitory readable storage medium storing a program or an instruction, where the program or instruction, when being executed by a processor, implements the steps of the method according to the first aspect or the second aspect.

According to a tenth aspect, a chip is provided, the chip including a processor and a communication interface, where the communication interface is coupled to the processor, and the processor is configured to execute a program or an instruction of a network side device, to implement the method in the first aspect or the method in the second aspect.

DESCRIPTION OF THE INVENTION

The following clearly describes the technical solutions in the embodiments of the present application with reference to the accompanying drawings in the embodiments of the present application. Apparently, the described embodiments are some of the embodiments of the present application rather than all of the embodiments. All other embodiments obtained by a person of ordinary skill in the art based on the embodiments of the present application shall fall within the protection scope of the present application.

The terms in the embodiments of the present application are described below.

1. AS Security Mechanism

In an LTE system and an NR system, encryption and integrity protection functions are respectively used for keeping that data and/or signaling transmitted to UE over an air interface from eavesdropping or tampering. Illustratively, encryption and/or integrity protection is performed on a DRB or an SRB or information carried thereon. In both LTE and NR, encryption and/or integrity protection of an AS layer is implemented in a PDCP layer. An RRC layer is responsible for the configuration of a security parameter and a security algorithm and the activation of a security function.

2. Encryption

An encryption process includes encryption and decryption. A transmit end device (a base station in a downlink and UE in an uplink) generates a key stream by using an encryption algorithm. Ciphertext is obtained by performing bit-by-bit binary addition on the key stream and plaintext. The key stream may be formed by using the following information: a 128-bit key, a 32-bit COUNT value, 5-bit BEARER (a radio bearer identity), 1-bit DIRECTION (used for indicating a transmission direction of the information is uplink/downlink), and 32-bit LENGTH (the length of the key stream). After receiving the ciphertext, a receive end device may generate the same key stream by using the same encryption algorithm and four other input parameters, and obtain the plaintext by performing bit-by-bit binary addition on the key stream and the ciphertext.

3. Integrity Protection

Input parameters of an integrity protection algorithm are: a 128-bit key, a 32-bit COUNT value, a 5-bit BEARER, a 1-bit DIRECTION, MESSAGE (a to-be-transmitted message), and LENGTH (the length of MESSAGE). Illustratively, reference may be made to FIG. 2 for an integrity protection process. The transmit end device uses the integrity protection algorithm to output a message authentication code for integrity MAC-I (for example, a message authentication code for integrity) with a certain length, and adds the MAC-I to a to-be-transmitted message. The receive end device generates an XMAC-I by using the same integrity protection algorithm and other input parameters, and checks the integrity of the message by comparing the XMAC-I and the MAC-I. If the XMAC-I and the MAC-I are the same, it is determined that the integrity check succeeds, or otherwise it is determined that the integrity check fails.

4. Key

In the 3GPP protocols, KRRCenc and KUPenc are respectively keys used to encrypt an SRB (or RRC signaling) and a DRB (or a user plane user plane) respectively. KRRCint and KUPint are respectively keys used for performing integrity protection on an SRB and a DRB. Both a base station (an eNB or a gNB) and UE need to derive KRRCenc, KUPenc, KRRCint, and KUPint based on an intermediate key KeNB/KgNB for AS security. KeNB/KgNB is derived from a key KASME/KAMF of a NAS layer. Both KASME and KAMF are derived step by step from a key K. The key K is stored in a SIM card and an authentication center.

5. Other Terms

The specification and claims of the present application, and terms "first" and "second" are used to distinguish similar objects, but are unnecessarily used to describe a specific sequence or order. It may be understood that the data used in such a way is interchangeable in proper circumstances, so that the embodiments of the present application can be implemented in other sequences than the sequence illustrated or described herein, Objects distinguished by "first" and "second" are usually of one type, and a quantity of the objects is not limited. For example, one or more first objects may be provided. In addition, "and/or" in the specification and claims indicates at least one of the connected objects, and the character "I" generally indicates an "or" relationship between the associated objects.

A communication system used in the method for obtaining a key provided in the embodiments of the present application is described below.

It needs to be noted that the technology described in the embodiments of the present application is not limited to a Long Term Evolution (LTE)/LTE-Advanced (LTE-A) system, and may be used in another wireless communication system such as Code Division Multiple Access (CDMA), Time Division Multiple Access (TDMA), Frequency Division Multiple Access FDMA), Orthogonal Frequency Division Multiple Access (OFDMA), and Single-carrier Frequency-Division Multiple Access (SC-FDMA), and another system. The terms "system" and "network" are often used interchangeably in the embodiments of the present application, and the technology described may be used for both the systems and radio technologies mentioned above as well as for other systems and radio technologies. However, the following descriptions describe New Radio (NR) systems for exemplary purposes and use the term NR for most of the following descriptions, these technologies may also be applied to applications other than NR system applications, for example, 6th Generation (6G) communication systems.

Figure 1:
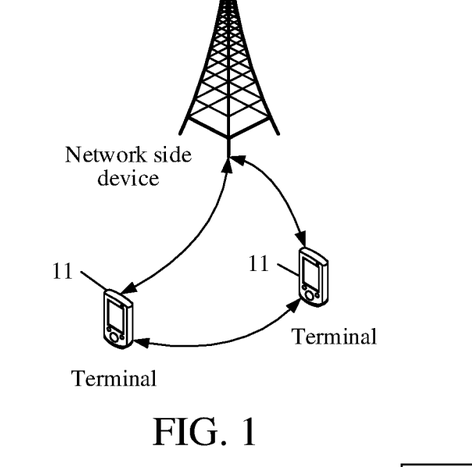
FIG. 1 is a schematic architectural diagram of a possible communication system according to an embodiment of the present application.

FIG. 1 is a block diagram of a wireless communication system to which an embodiment of the present application is applicable. The wireless communication system includes a terminal 11 and a network side device 12.

The terminal 11 includes slave UE and master UE. The slave UE is referred to as slave UE (SUE for short). The master UE is referred to as master UE (MUE for short). For example, a key corresponding to the SUE may be abbreviated as Ksue. Ksue is only an example. The key may be named as required during actual application. The name of the key is not limited in the present application.

The terminal 11 may also be referred to as a terminal device or UE. The terminal 11 may be a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device or an in-vehicle device (VUE), a pedestrian UE (PUE), among other terminal side devices. The wearable device includes a wristband, headphones, glasses, and the like. It should be noted that some type of the terminal 11 is not limited in the embodiments of the present application. The network side device 12 may be a base station or a core network. The base station may be referred to as a node B, an evolved node B, an access point, a base transceiver station BTS), a radio base station, a radio transceiver, a basic service set (BSS), an extended service set (ESS), a B node, an evolved B node (eNB), a home B node, a home evolved B node, a WLAN access point, a WiFi node, a transmitting receiving point (TRP) or some other appropriate term in the field, provided that the same technical effect is achieved. The base station is not limited to a specific technical vocabulary. It needs to be noted that a base station in an NR system is only used as an example in the embodiments of the present application. However, some type of the base station is not limited.

The method for obtaining a key provided in the embodiments of the present application is described in detail below through some embodiments and their application scenarios in conjunction with the accompanying drawings.

Figure 2:
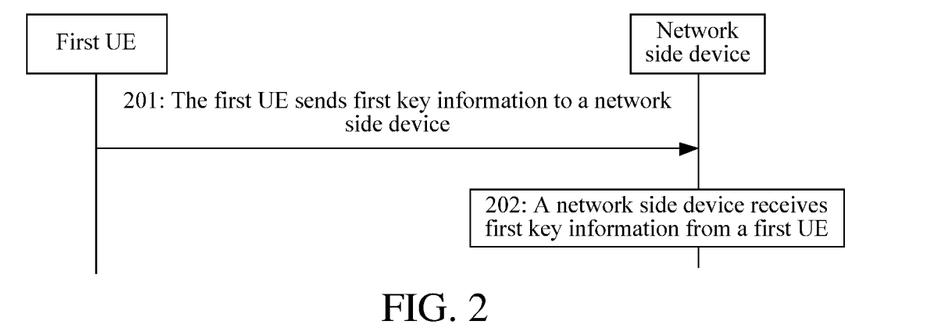
FIG. 2 is a schematic flowchart 1 of a method for obtaining a key according to an embodiment of the present application.

FIG. 2 is a schematic flowchart of a method for obtaining a key according to an embodiment of the present application. As shown in FIG. 2, the method for obtaining a key may include the following steps.

Step 201: The first UE sends first key information to a network side device.

For example, the first key information is used for indicating a first key of a second UE. The first key is used for performing encryption and/or integrity protection on data in communication between the second UE and the network side device. The integrity protection refers to operations to keep data from tampering during transmission and storage of data. The encryption refers to operations to keep data from eavesdropping during transmission and storage of data.

For example, the first UE is master UE (that is, MUE). The second UE is slave UE (that is, SUE).

For example, the data in the communication between the second UE and the network side device includes data (a service data flow of one or more services or data transmitted on one or more carriers) in a user plane and signaling in a control plane.

In an example, when the second UE performs integrity protection on the data in the communication between the second UE and the network side device based on the first key, the network side device performs integrity check on the data in the communication between the second UE and the network side device based on the first key.

In another example, when the second UE performs an encryption operation on the data in the communication between the second UE and the network side device based on the first key, the network side device performs a decryption operation on the data in the communication between the second UE and the network side device based on the first key.

For example, before sending the first key information, the first UE needs to be set to an activated state of AS security. Generally, after an AS security function is activated for the first UE, AS security context of the first UE is established locally and/or on the network side device.

For example, for an encryption process, an encryption algorithm in an encryption process in the embodiments of the present application is configured by a network side device for UE. COUNT, BEARER, DIRECTION, and LENGTH in five input parameters of a key stream may be obtained according to current data. A 128-bit key is derived by the network side device and the UE according to a certain rule, and is not transmitted over an air interface for security reasons.

For example, for an integrity protection process, an integrity protection algorithm in the embodiments of the present application is configured by the network side device for the UE. COUNT, BEARER, DIRECTION, LENGTH, and MESSAGE in five input parameters of a key stream may be obtained according to current data. A 128-bit key is derived by the network side device and the UE according to a certain rule, and is not transmitted over an air interface for security reasons.

In the method for obtaining a key provided in the embodiments of the present application, to ensure encryption and/or integrity protection of data and/or signaling transmitted over an air interface, second UE relies on first UE to report/negotiate a security key of the second UE to a network side device, so that the second UE can use the security key to perform encryption and/or integrity protection on data in communication between the second UE and the network side device, thereby effectively ensuring the reliability of communication between the second UE and the network side device.

In the embodiments of the present application, the first UE may at least obtain the first key of the second UE in at least three key obtaining manners below.

In a first possible embodiment:

Optionally, in the embodiments of the present application, the second UE has the capability of generating the security key of the second UE but cannot securely indicate the security key to the network side device. In this case, the second UE may indicate the security key of the second UE to the network side device through the first UE.

For example, before step 201, the method for obtaining the key provided in the embodiments of the present application may include the following step 201a:

Step 201a: The first UE obtains all or a portion of information of the first key of the second UE from the second UE.

For example, the first key of the second UE may be generated by the second UE.

For example, when the second UE sends the first key of the second UE to the first UE, the second UE may choose to send all information of the first key to the first UE or may choose to send part of information of the first key to the first UE (the first UE may derive or obtain the complete first key based on the part of information).

Further optionally, in the embodiments of the present application, the first key information includes: all or a portion of information of the first key of the second UE; or all or a portion of information of the first key of the second UE and a UE identity of the second UE. It should be noted that the UE identity of the second UE in the embodiments of the present application is a UE identity allocated/stored by the network side device for the SUE in advance.

For example, the UE identity may include at least one of the following: an International Mobile Subscriber Identification Number (IMSI), a Network Access Identifier NAI), a SUPI (Subscription permanent identifier), a SUCI (Subscription Concealed Identifier), a 5G Globally Unique Temporary UE Identity (5G GUTI), a GUTI (Globally Unique Temporary UE Identity), an S-TMSI, an ng-S-TMSI, a 5G TMSI, a TMSI, a C-RNTI, a TC-RNTI, an I-RNTI, and a fullI-RNTI. In an example, the UE identity may be part (for example, a short I-RNTI) of an identity such as a C-RNTI, a TC-RNTI, an I-RNTI, and a fullI-RNTI.

Optionally, in the embodiments of the present application, due to the security problem in some scenarios, the first key of the second UE cannot be transmitted over an air interface in these scenarios. Therefore, the first UE may calculate the first key of the second UE by using information related to the second UE.

For example, before step 201, the method for obtaining a key provided in the embodiments of the present application may include the following step 201*b*:

Step 201*b*: The first UE calculates the first key of the second UE according to target information and an input parameter.

The target information includes first information or a security key of the first UE.

For example, the first information is a same parameter or a related parameter stored in the first UE and the second UE. For example, one or more same or related parameters are stored in both the MUE and the SUE. For example, both the MUE and the SUE are the manufacturer identification code of the same manufacturer.

For example, the security key of the first UE includes at least one of the following: a first subkey or a second subkey. The first subkey is a key related to a first access network element. That is, the first subkey is used for transmission between the first UE and the first access network element. The second subkey is a key related to a second access network element. That is, the second subkey is used for transmission between the first UE and the second access network element. It should be noted that the first subkey or the second subkey may be referred to as a root key or may be referred to as KeNB, KgNB, an AS (access layer) security key, or the like.

In an example, when the first UE and the second UE are in a dual connectivity scenario, the first access network element may be a primary base station. That is, the first subkey may be used for secure transmission between the first UE and the primary base station. Correspondingly, the second access network element may be a secondary base station. That is, the first subkey may be used for secure transmission between the first UE and the secondary base station.

For example, the input parameter includes at least one of the following: a target parameter, a physical cell identifier PCI of a cell in which the second UE is located, frequency information of a cell in which the second UE is located, or device information of the second UE; and the target parameter includes at least one of the following: a counter, a random number, or a sequence. In an example, the counter is an Sue-counter. When Ksue is calculated for the first time, the value of Sue-counter is 0. After calculation, the value of Sue-counter turns into 1, and increments every time after Ksue is calculated. When the key of the MUE is updated, the value of Sue-counter is reset. It should be noted that the name of the counter is not limited in the embodiments of the present application.

It should be noted that the target parameter may improve the corresponding randomness of the first key, to allow the first key to be updated, thereby improving the security of the first key. In an example, the counter may increment according to a quantity of times that the first key is obtained.

Further optionally, in the embodiments of the present application, in a case that the target information is the first information, the first key information includes at least one of the following: the first key, the input parameter, a UE identity of the second UE, or the first information; or in a case that the target information is the security key, the first key information includes at least one of the following: the first key, the input parameter, a UE identity of the second UE, or the first instruction information. The first instruction information is used for instructing to use the security key to perform encryption and/or integrity protection on the data in the communication between the second UE and the network side device.

Optionally, in the embodiments of the present application, due to the security problem in some scenarios, the first key of the second UE cannot be transmitted over an air interface in these scenarios. Therefore, the first UE may reuse the security key of the first UE for the second UE.

For example, before step 201, the method for obtaining a key provided in the embodiments of the present application may include the following step 201*c*1 and step 201*c*2.

Step 201*c*1: The first UE receives a key request from the second UE.

The key request is used for requesting to use a security key of the first UE to perform encryption and/or integrity protection on data in communication between the second UE and the network side device; the security key of the first UE includes a first subkey and a second subkey; and the first subkey is a key related to a first access network element, and the second subkey is a key related to a second access network element. For example, in a dual connectivity scenario, the MUE may reuse the security key of the SCG for the SUE.

Step 201*c*2: The first UE uses the second subkey as the first key of the second UE according to the key request.

Further optionally, in the embodiments of the present application, the first key information includes at least one of the following: second instruction information, or a UE identity of the second UE, and the second instruction information is used for instructing to use the first subkey or the second subkey to perform encryption and/or integrity protection on the data in the communication between the second UE and the network side device.

Figure 3:
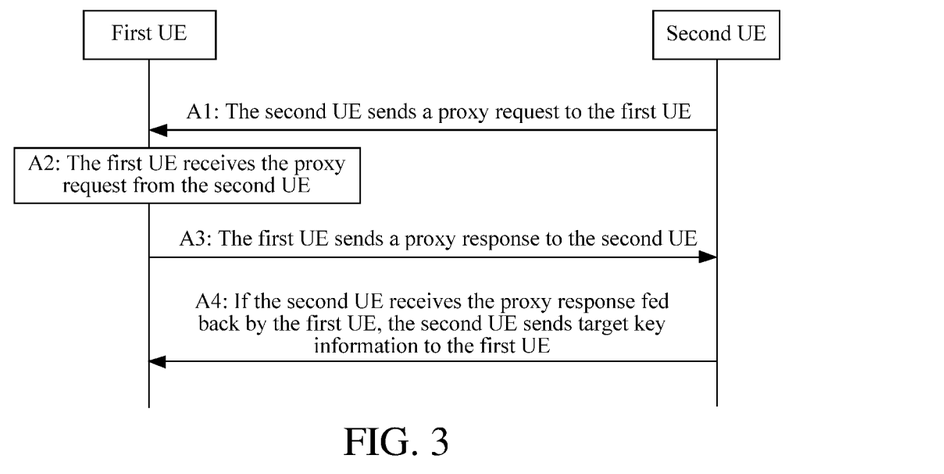
FIG. 3 is a schematic flowchart 2 of a method for obtaining a key according to an embodiment of the present application.

Optionally, in the embodiments of the present application, as shown in FIG. 3, before step 201, the method for obtaining a key provided in the embodiments of the present application may include the following step A1 to step A4.

Step A1: The second UE sends a proxy request to the first UE.

Step A2: The first UE receives the proxy request from the second UE.

Step A3: The first UE sends a proxy response to the second UE.

Step A4: If the second UE receives the proxy response fed back by the first UE, the second UE sends target key information to the first UE.

The proxy request is used for requesting proxy for a security process of the second UE. The proxy response is used for instructing the first UE to accept proxy for the security process of the second UE. The target key information is used for indicating the first key of the second UE. The first key is used for performing encryption and/or integrity protection on data in communication between the second UE and the network side device.

For example, the target key information includes all or a portion of information of the first key, or a key request. The key request is used for requesting to use a security key of the first UE to perform encryption and/or integrity protection on data in communication between the second UE and the network side device; the security key of the first UE includes a first subkey and a second subkey; and the first subkey is a key related to a first access network element, and the second subkey is a key related to a second access network element.

Further optionally, in the embodiments of the present application, before step A1, the method for obtaining a key provided in the embodiments of the present application may include the following step B1 and step B2.

Step B1: The first UE sends second information.

Step B2: The second UE receives the second information from the first UE. The second information is used for indicating that the first UE has a capability of proxy for a security process of another UE.

In an example, the first UE broadcasts the second information, to inform nearby UEs that the first UE has a capability of proxy for a security process of another UE. Because the second UE does not have a capability of obtaining a security key, after receiving the second information, the second UE sends a proxy request to the first UE, to request the first UE to transfer the security key of the first UE to the network side device. That is, the proxy request may be a request initiated after the second UE receives the second information broadcast by the first UE.

In another example, the SUE broadcasts the proxy request to nearby UEs (the nearby UEs include the MUE). In this way, after receiving a proxy request of the SUE, the MUE may send feedback information to the SUE, to inform the SUE that the MUE has accepted the proxy request of the security key, to further complete the proxy of the security key.

Optionally, in the embodiments of the present application, after step 201, the method for obtaining a key provided in the embodiments of the present application may include the following step C1 and step C2.

Step C1: The first UE sends the first key information to the second UE.

Step C2: The second UE receives the first key information from the first UE.

The first key information is used for indicating the first key of the second UE.

For example, an encryption operation may be used during the transfer of key information between the first UE and the second UE. For example, a secure encryption method of an interface protocol between the first UE and the second UE, application layer encryption, non-3GPP encryption, or the like may be used.

In the embodiments of the present application, in a case that the first key of the second UE is changed or needs to be changed, the first UE, the second UE, and the network side device may all initiate a key update procedure.

Optionally, in the embodiments of the present application, for a process in which the first UE initiates the key update procedure, after step 201, the method for obtaining a key provided in the embodiments of the present application may include the following step D1.

Step D1: In a case that a first condition is met, the first UE sends second key information to the network side device and/or the second UE, where the second key information is used for indicating an updated first key.

The first condition includes at least one of the following: that the first key of the second UE is changed, or that information used for calculating the first key of the second UE is changed. For example, the information used for calculating the first key of the second UE may be the above all or a portion of information for calculating the first key, for example, the security key of the first UE, the input parameter, the target information, the key request, and the like.

For example, for the counter in the input parameters, that the information used for calculating the first key of the second UE is changed includes: Sue-counter wraps around (that is, the count of the counter exceeds a maximum value and starts again from 0), and the value of uplink or downlink PDCP COUNT of any SRB or DRB of the second UE is about to reach a boundary value. For example, when Sue-counter wraps around, the security key or first information of the first UE needs to be updated. Illustratively, the PDCP COUNT is one of the five parameters of a key stream. If the value reaches a boundary value, the count restarts from 0. In this case, if the values of the other four parameter remain unchanged, the UE may use the same key in a transmission process of sending different data, resulting insecurity. In this case, a new key needs to be regenerated to ensure the security of the data.

For example, after calculating a new first key or first key change amount, the first UE informs the network side device of the new first key or first key change amount or related parameter for calculating the first key. The first key change amount may be a difference between the new first key and an old first key (for example, a change amount of the value of sue-counter, a change amount of a PCI of a cell in which the SUE is located, or a change amount of frequency information), or may be an updated input parameter (for example, a new value of sue-counter, a PCI of a cell in which the SUE is located the last time, or frequency information), or may be changed target information (for example, previously the second subkey is used as target information for calculating the first key, and instead the first subkey is used as the target information for calculating the first key), or may be a changed key request (For example, previously the second subkey is used as the first key, and instead the first subkey is used as the first key). The network side device and the SUE generate the new first key by using the negotiated method.

Optionally, in the embodiments of the present application, for a process in which the second UE initiates the key update procedure, after step 201, the method for obtaining a key provided in the embodiments of the present application may include the following step E1.

Step E1: In a case that a first condition is met, the second UE sends third key information to the network side device, where the third key information is used for indicating an updated first key.

The first condition includes at least one of the following: that the first key of the second UE is changed, or that information used for calculating the first key of the second UE is changed. For example, the information used for calculating the first key of the second UE may be the above all or a portion of information for calculating the first key, for example, the security key of the first UE, the input parameter, the first information, and the like.

For example, the second UE may send the third key information to the network side device directly or through the first UE.

For example, the SUE may inform the network side device of the new first key or first key change amount or the updated input parameter or the updated target information (through an air interface of the SUE or through forwarding to the network side device by the MUE). The first key change amount may be a difference between the new first key and an old first key (for example, a change amount of the value of sue-counter, a change amount of a PCI of a cell in which the SUE is located, or a change amount of frequency information), or may be an updated input parameter (for example, a new value of sue-counter, a PCI of a cell in which the SUE is located the last time, or frequency information), or may be changed target information (for example, previously the second subkey is used as target information for calculating the first key, and instead the first subkey is used as the target information for calculating the first key), or may be a changed key request (For example, previously the second subkey is used as the first key, and instead the first subkey is used as the first key). The network side device and the SUE generate the new first key by using the negotiated method.

FIG. 2 is a schematic flowchart of a method for obtaining a key according to an embodiment of the present application. On the side of a network side device, the method for obtaining a key may include the following steps.

Step 202: A network side device receives first key information from a first UE.

The first key information is used for indicating a first key of second UE; and the first key of the second UE is used for performing encryption and/or integrity protection on data in communication between the second UE and the network side device. It should be noted that for the related description of the first key information, reference may be made to the foregoing description. Details are not described herein again.

Optionally, in the embodiments of the present application, after receiving the target key information transmitted by the first UE or the second UE, the network side device may obtain the updated first key of the second UE. For example, after step 202, the method may further include the following steps.

Step 301a1: The network side device receives target key information from target UE.

Step 301a2: The network side device determines an updated first key of the second UE according to the target key information.

The target UE includes the first UE or the second UE. The target key information is used for indicating the updated first key of the second UE. In an example, the target key information may be the second key information or third key information in the foregoing embodiments.

Optionally, in the embodiments of the present application, the network side device may recalculate the first key of the second UE. That is, the network side device initiates a process of a key update procedure. For example, after step 202, the method may further include the following steps.

Step 301b1: In a case that a first condition is met, the network side device sends fourth key information to the target UE.

The target UE includes the first UE or the second UE. The fourth key information is used for indicating an updated first key of the second UE.

For example, the first condition includes at least one of the following: that the first key of the second UE is changed, or that information used for calculating the first key of the second UE is changed. For example, the information used for calculating the first key of the second UE may be the above all or a portion of information for calculating the first key, for example, the security key of the first UE, the input parameter, the first information, and the like.

For example, after calculating a new first key or first key change amount, the network side device informs the SUE of the new first key or first key change amount or related parameter for calculating the first key (through an interface of the SUE or through forwarding to the SUE by the MUE). The first key change amount may be a difference between the new first key and an old first key (for example, a change amount of the value of sue-counter, a change amount of a PCI of a cell in which the SUE is located, or a change amount of frequency information), or may be an updated input parameter (for example, a new value of sue-counter, a PCI of a cell in which the SUE is located the last time, or frequency information), or may be changed target information (for example, previously the second subkey is used as target information for calculating the first key, and instead the first subkey is used as the target information for calculating the first key), or may be a changed key request (For example, previously the second subkey is used as the first key, and instead the first subkey is used as the first key). The network side device and the SUE generate the new first key by using the negotiated method.

Optionally, in the embodiments of the present application, after step 202, the method may further include the following step 301c1 to step 301c4.

Step 301c1: In a case that a second condition is met, the network side device sends third information to the second UE.

Step 301c2: The second UE receives third information from the network side device.

Step 301c3: The second UE feeds back response information to the network side device.

Step 301c4: The network side device receives the response information from the second UE.

The third information is used for activating a security state of the second UE and/or confirming a security key of the second UE; and the response information is used for indicating that the security state of the second UE is activated.

For example, the second condition includes at least one of the following: that the second UE enters an RRC connected state, that the network side device has established security context of the second UE, or that downlink data of the second UE has arrived and the security state is not activated.

In this way, after learning the first key of the second UE, the network side device may activate the security state of the second UE, so that it is ensured that subsequently encryption and/or integrity protection can be performed on the data in the communication between the second UE and the network side device, thereby effectively ensuring the reliability of communication between the second UE and the network side device.

The foregoing various manners of obtaining a key are described below by using an example in which the first UE is MUE and the second UE is SUE.

Example 1: The SUE has a capability of generating a key of the SUE (Ksue for short), that is, the first key, but cannot securely indicate the key to the network side device. In this case, the key may be sent to the network side device through the MUE. Illustratively:

Step 1: The MUE has activated AS security and established AS security context with a gNB.

Step 2: The SUE requests to transfer a security key to the gNB through the MUE.

Optionally, the request may be made in the following two manners:

Manner 1: The SUE initiates the request after receiving information (the information indicates that the MUE has a capability of proxy for an AS security process of another UE and a network side device) broadcast by the MUE.

Manner 2: The SUE broadcasts a security proxy request to nearby UEs (the nearby UEs include the MUE).

Step 3: The MUE receives the proxy request of the SUE.

Optionally, the MUE sends a feedback (for example, accepting the request of the SUE) after receiving the request of the SUE.

Step 4: The SUE sends Ksue to the MUE. An encryption manner such as non-3GPP encryption or application layer encryption may be used in the transmission between the SUE and the MUE.

Optionally, the SUE sends an SUE identity together to the MUE. The SUE initiates an RRC connection establishment procedure at the gNB (through an air interface of the SUE or an air interface of the MUE). A cause value of the establishment is negotiation of a security key. After receiving Msg4, the SUE obtains a C-RNTI from msg2 as the SUE identity. In a proxy negotiation procedure between the MUE and the SUE, the MUE requests a UE identity generated by the gNB for the SUE.

Step 5: After receiving the Ksue, the MUE sends first key information to the gNB, where the first key information includes Ksue or Ksue and the SUE identity. Encryption and/or integrity protection may be performed on the first key information by using an AS key of the MUE.

Step 6: After receiving the first key information, the gNB may authenticate the identity of the SUE according to the SUE identity, and store Ksue after the authentication succeeds for subsequent AS encryption and/or integrity protection during communication with the SUE.

Step 7: When a first condition is met, the gNB sends third information (for example, an SMC) to the SUE, where the third information is used for activating AS security and/or confirming an AS security key. For example, the first condition includes at least one of the following: that the UE enters an RRC connected state, or that once the Gnb has established AS security context of the SUE (the context includes a security key of the SUE and a related parameter), that downlink data of the SUE has arrived and AS security is not activated.

Step 8: After receiving the third information (through the air interface of the SUE or forwarding by the MUE), the SUE accurately decodes information in the third information, and sends a response to the gNB, so that subsequently an uplink security state is activated.

Example 2: In consideration of the security in some scenarios, an SUE cannot be transmitted over an air interface. An MUE key may be used as a root key, and only an SUE counter is transmitted over an air interface to ensure safety. Illustratively:

Step 1 to step 3 are the same as those in Example 1. Details are not described herein again.

Step 4: The MUE calculates Ksue according to the MUE root key and the related parameter (that is, the foregoing input parameter) of the SUE. The MUE root key includes any one or more of KgNB and S-KgNB (that is, a key used for SCG transmission by the MUE). The related parameter of the SUE includes a different combination of the following information: a counter (for example, a Sue-counter), a PCI (a physical cell ID) of a cell in which the SUE is located, frequency information, device information (for example, an IMEI) of the SUE, or the like.

Step 5: The MUE indicates Ksue to the SUE through an interface between the MUE and the SUE. When an encryption mechanism is used in the transfer of information between the MUE and the SUE, for example, an application layer encryption mechanism or a non-3GPP encryption mechanism is used.

Step 6: The MUE sends first key information to the gNB, where encryption and/or integrity protection is performed on the first key information by using the AS key of the MUE, and the first key information includes at least one of the following: Ksue, the related parameter of the SUE, first instruction information (instruction information for instructing to use KgNB or S-KgNB to calculate Ksue), or the SUE identity.

Step 6: After receiving the first key information, the gNB authenticates the identity of the SUE according to the SUE identity, and store Ksue after the authentication succeeds for subsequent AS encryption and/or integrity protection during communication with the SUE.

Step 7 and step 8 are the same as step 7 and step 8 in Example 1. Details are not described herein again.

It needs to be noted that for the description of the proxy request, the SUE identity, and the value of sue-counter in this example, reference may be made to Example 1 unless otherwise described. Details are not described herein again.

Example 3: In consideration of the security in some scenarios, an SUE cannot be transmitted over an air interface. An SCG key may be used for the SUE to ensure safety. Illustratively:

Step 1: The MUE has activated AS security and established AS security context with a base station.

Step 2: The SUE requests to use the SCG key of the MUE.

Step 3: The MUE receives a request of the SUE.

Step 4: The MUE sends the generated second key (for example, a key S-KgNB of the SCG) as Ksue to the SUE. When the MUE sends S-KgNB to the SUE, an encryption mechanism is used in the transfer of information between the MUE and the SUE, for example, an application layer encryption mechanism or a non-3GPP encryption mechanism is used.

Optionally, before sending to the SUE, the MUE sends fourth information to the gNB and receives acknowledgment information returned by the network side device, where the fourth information is used for requesting to use the key of the SCG for another UE (SUE).

Step 5: The MUE sends first key information to the gNB, where the first key information includes second instruction information (used for instructing to use the SCG key of the MUE for the SUE), and the SUE identity.

Step 6: After receiving the first key information, the gNB authenticates the identity of the SUE according to the SUE identity, and uses S-KgNB after the authentication succeeds for subsequent AS encryption and/or integrity protection during communication with the SUE.

Step 7 and step 8 are the same as step 7 and step 8 in Example 1. Details are not described herein again.

It needs to be noted that for the description of the proxy request, the SUE identity, and the value of sue-counter in this example, reference may be made to Example 1 unless otherwise described. Details are not described herein again.

Example 4: The MUE derives the SUE key based on one set of commonly known parameters of the MUE and the SUE. Illustratively:

Step 1 to step 3 are the same as those in Example 1. Details are not described herein again.

Step 4: The MUE calculates Ksue according to the target information and at least one input parameter. The target information is one or more same or related parameters stored in both the MUE and the SUE, for example, an identifier that mobile phones or watches of the same manufacturer. The input parameter includes one or more of Sue-counter, a random number, the PCI of the SUE, and frequency.

Step 5: The MUE indicates the one or more input parameters in step 4 to the SUE. The SUE calculates Ksue based on the target information and the group of input parameters.

Step 6: The MUE sends first key information to the gNB, where the first key information includes at least one of the following: Ksue, the foregoing input parameter, the target information, or the SUE identity.

Step 7: After receiving the first key information, the gNB authenticates the identity of the SUE according to the SUE identity, and store/calculates Ksue after the authentication succeeds for subsequent AS encryption and/or integrity protection during communication with the SUE.

Step 8: When Ksue needs to be updated, the MUE or SUE informs the gNB and/or the SUE of updated Ksue or only the one or more input parameters for calculating Ksue.

In the foregoing procedure, the SUE may calculate Ksue According to the target information and the one or more input parameters, and sends the one or more input parameters for calculating Ksue to the MUE. The one or more input parameters are than forwarded to the network side device.

It needs to be noted that for the description of the proxy request, the SUE identity, and the value of sue-counter in this example, reference may be made to Example 1 unless otherwise described. Details are not described herein again.

For example, in the foregoing four examples, when the parameter for calculating Ksue has changed, Ksue needs to be updated. In an example, when the first condition is met, the MUE recalculates Ksue. Next, the MUE informs the gNB of the new Ksue or related information required to derive Ksue. In another example, when the first condition is met, the SUE recalculates Ksue. Next, the SUE informs the gNB of the new Ksue or related information required to derive Ksue (for the manner, reference may be made to the foregoing four examples). It needs to be noted that at any time, the SUE and the gNB recalculates keys KRRCenc, KUPenc, KRRCint, and KUPint for new Ksue.

In an example, the foregoing first condition includes at least one of the following:

that one of KgNB, KeNB, S-KgNB, and S-KeNB is used to calculate Ksue and the value of the key changes;

that Sue-counter wraps around (the count of Sue-counter exceeds a maximum value and starts again from 0);

that the PCI of the SUE and the frequency information changes; or that the value of an uplink/downlink PDCP COUNT of any SRB or DRB of the SUE is about to reach a boundary value.

It needs to be noted that the method for obtaining a key provided in the embodiments of the present application may be performed by an apparatus for obtaining a key or a control module configured to perform the method for obtaining a key in the apparatus for obtaining a key. The apparatus for obtaining a key may be UE. The method for obtaining a key provided in the embodiments of the present application is described by using UE as an example in the embodiments of the present application.

Figure 4:
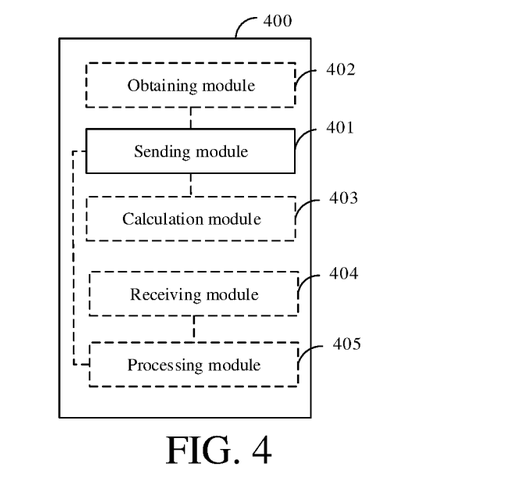
FIG. 4 is a schematic structural diagram 1 of an apparatus for obtaining a key according to an embodiment of the present application.

FIG. 4 is a schematic structural diagram of an apparatus for obtaining a key according to an embodiment of the present application. As shown in FIG. 4, the apparatus for obtaining a key includes a sending module 401. The sending module 401 is configured to send first key information to a network side device, where the first key information is used for indicating a first key of second UE, and the first key is used for performing encryption and/or integrity protection on data in communication between the second UE and the network side device.

Optionally, as shown in FIG. 4, the apparatus for obtaining a key further includes an obtaining module 402. The obtaining module 402 is configured to obtain all or a portion of information of the first key of the second UE from the second UE.

Optionally, the first key information includes: all or a portion of information of the first key of the second UE; or all or a portion of information of the first key of the second UE and a UE identity of the second UE.

Optionally, as shown in FIG. 4, the apparatus for obtaining a key further includes a calculation module 403. The calculation module 403 is configured to calculate the first key of the second UE according to target information and an input parameter. The target information includes first information or a security key of the first UE. The first information is a same parameter or a related parameter stored in the first UE and the second UE; the security key of the first UE includes a first subkey and a second subkey; the first subkey is a key related to a first access network element; and the second subkey is a key related to a second access network element. The input parameter includes at least one of the following: a target parameter, a PCI of a cell in which the second UE is located, frequency information of a cell in which the second UE is located, or device information of the second UE; and the target parameter includes at least one of the following: a counter, a random number, or a sequence.

Optionally, in a case that the target information is the first information, the first key information includes at least one of the following: the first key, the input parameter, a UE identity of the second UE, or the first information; or in a case that the target information is the security key, the first key information includes at least one of the following: the first key, the input parameter, the UE identity of the second UE, or first instruction information; and the first instruction information is used for instructing to use the security key of the first UE to generate the first key of the second UE.

Optionally, as shown in FIG. 4, the apparatus 400 for obtaining a key further includes a receiving module 404 and a processing module 405. The receiving module 404 is configured to receive a key request from the second UE, where the key request is used for requesting to use a second key of the first UE to perform encryption and/or integrity protection on data in communication between the second UE and the network side device; the second key includes a first subkey and a second subkey; and the first subkey is a key related to a first access network element, and the second subkey is a key related to a second access network element. The processing module 405 is configured to use the second key as the first key of the second UE according to the key request received by the receiving module 404.

Optionally, the first key information includes at least one of the following: second instruction information, or a UE identity of the second UE, and the second instruction information is used for instructing to use the security key of the first UE to perform encryption and/or integrity protection on data in communication between the second UE and the network side device.

Optionally, the receiving module 404 is further configured to receive a proxy request from the second UE, where the proxy request is used for requesting proxy for a security process of the second UE; and the sending module 401 is further configured to send a proxy response to the second UE, where the proxy response is used for instructing the first UE to accept proxy for the security process of the second UE.

Optionally, the sending module 401 is further configured to send second information, where the second information is used for indicating that the first UE has a capability of proxy for a security process of another UE.

Optionally, the sending module 401 is further configured to: in a case that a first condition is met, send second key information to the network side device or the second UE, where the second key information is used for indicating an updated first key.

Optionally, the first condition includes at least one of the following: that the first key of the second UE is changed, or that information used for calculating the first key of the second UE is changed.

Optionally, the sending module 401 is further configured to send the first key to the second UE.

In the apparatus for obtaining a key provided in the embodiments of the present application, to ensure encryption and/or integrity protection of data and/or signaling transmitted over an air interface, the apparatus for obtaining a key relies on first UE to report a security key of second UE to a network side device, so that the apparatus for obtaining a key can use the security key to perform encryption and/or integrity protection on data in communication between the second UE and the network side device, thereby effectively ensuring the reliability of communication between the second UE and the network side device.

Figure 5:
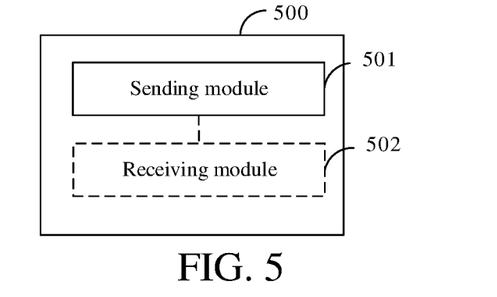
FIG. 5 is a schematic structural diagram 2 of an apparatus for obtaining a key according to an embodiment of the present application.

FIG. 5 is a schematic structural diagram of an apparatus for obtaining a key according to an embodiment of the present application. As shown in FIG. 5, the apparatus for obtaining a key includes a sending module 501. The sending module 501 is configured to send a proxy request to first UE. The sending module 501 is further configured to: if a proxy response fed back by the first UE is received, send target key information to the first UE. The proxy request is used for requesting proxy for a security process of the second UE. The proxy response is used for instructing the first UE to accept proxy for the security process of the second UE. The target key information is used for indicating the first key. The first key is used for performing encryption and/or integrity protection on data in communication between the second UE and the network side device.

Optionally, the target key information includes all or a portion of information of the first key, or a key request. The key request is used for requesting to use a second key of the first UE to perform encryption and/or integrity protection on data in communication between the second UE and the network side device; the second key includes a first subkey and a second subkey; and the first subkey is a key related to a first access network element, and the second subkey is a key related to a second access network element.

Optionally, as shown in FIG. 5, the apparatus 500 for obtaining a key further includes a receiving module 502. The receiving module 502 is configured to receive second information from the first UE, where the second information is used for indicating that the first UE has a capability of proxy for a security process of another UE.

Optionally, the sending module 501 is further configured to: in a case that a first condition is met, send third key information to a network side device and/or the first UE, where the third key information is used for indicating an updated first key.

Optionally, the first condition includes at least one of the following: that the first key of the second UE is changed, or that information used for calculating the first key of the second UE is changed.

Optionally, the receiving module 502 is further configured to receive first key information, from the first UE, where the first key information is used for indicating the first key of the second UE.

Optionally, the receiving module 502 is further configured to receive third information from the network side device, where the third information is used for activating a security state of the second UE and/or confirming a security key of the second UE. The sending module 501 is further configured to feed back response information to the network side device, where the response information is used for indicating that an uplink security state of the second UE is activated.

In the apparatus for obtaining a key provided in the embodiments of the present application, to ensure encryption and/or integrity protection of data and/or signaling transmitted over an air interface, the apparatus for obtaining a key may obtain first key information sent by the first UE proxy for the second UE to obtain a security key of the second UE, so that the apparatus for obtaining a key can use the security key to perform encryption and/or integrity protection on data in communication between the second UE and the network side device, thereby effectively ensuring the reliability of communication between the second UE and the network side device.

Figure 6:
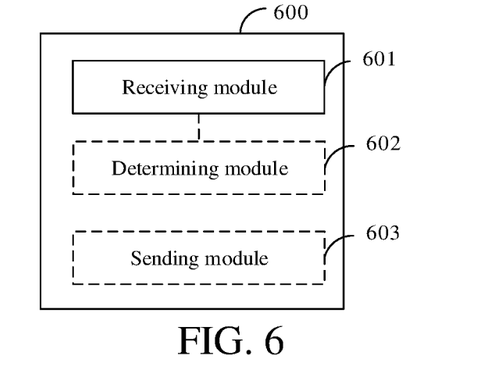
FIG. 6 is a schematic structural diagram 3 of an apparatus for obtaining a key according to an embodiment of the present application.

FIG. 6 is a schematic structural diagram of an apparatus for obtaining a key according to an embodiment of the present application. As shown in FIG. 6, the apparatus 600 for obtaining a key includes a receiving module 601. The receiving module 601 is configured to receive first key information from first UE. The first key information is used for indicating a first key of second UE; and the first key of the second UE is used for performing encryption and/or integrity protection on data in communication between the second UE and the network side device.

Optionally, as shown in FIG. 6, the apparatus 600 for obtaining a key further includes a determining module 602. The receiving module 601 is further configured to receive target key information from target UE, where the target UE includes the first UE or the second UE. The determining module 602 is configured to determine an updated first key of the second UE according to the target key information. The target key information is used for indicating the updated first key of the second UE.

Optionally, as shown in FIG. 6, the apparatus 600 for obtaining a key further includes: a sending module 603, configured to: in a case that a first condition is met, send fourth key information to the target UE, where the target UE includes the first UE or the second UE, and the target key information is used for indicating an updated first key of the second UE.

Optionally, the sending module 603 is further configured to: in a case that a second condition is met, send third information to the second UE. The receiving module 601 is further configured to receive response information from the second UE. The third information is used for activating a security state of the second UE and/or confirming a security key of the second UE; and the response information is used for indicating that the security state of the second UE is activated. The second condition includes at least one of the following: that the second UE enters an RRC connected state, that the network side device has established security context of the second UE, or that downlink data of the second UE has arrived and the security state is not activated.

In the apparatus for obtaining a key provided in the embodiments of the present application, to ensure encryption and/or integrity protection of data and/or signaling transmitted over an air interface, the apparatus for obtaining a key sends a proxy request to second UE to request to rely on first UE to report a security key of the second UE to a network side device, so that the apparatus for obtaining a key can use the security key to perform encryption and/or integrity protection on data in communication between the second UE and the network side device, thereby effectively ensuring the reliability of communication between the second UE and the network side device.

The apparatus for obtaining a key may be an apparatus or may be a part, an integrated circuit or a chip in UE. The apparatus may be a mobile terminal or may be a non-mobile terminal. For example, the mobile terminal may include, but is not limited to, the type of the terminal listed above. The non-mobile terminal may be a server, a Network Attached Storage (NAS), a personal computer (PC), a television (TV), a teller machine, a kiosk, or the like. This is not limited in the embodiments of the present application.

The apparatus for obtaining a key in the embodiments of the present application may be an apparatus with an operating system. The operating system may be an Android operating system, may be an iOS operating system, or may be another possible operating system. This is not limited in the embodiments of the present application.

The apparatus for obtaining a key provided in the embodiments of the present application can implement each process implemented in the method embodiments, and the same technical effect can be achieved. To avoid repetition, details are not described herein again.

Figure 7:
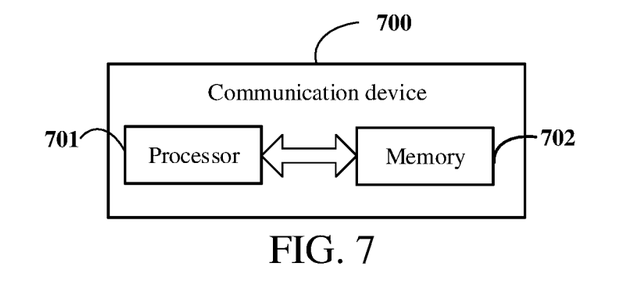
FIG. 7 is a schematic diagram of a hardware structure of a communication device according to an embodiment of the present application.

Optionally, as shown in FIG. 7, the embodiments of the present application further provide a communication device 700, including a processor 701, a memory 702, and a program or an instruction stored in the memory 702 and runnable on the processor 701. For example, when the communication device 700 is a terminal, the program or instruction, when being executed by the processor 701, implements each process in the embodiments of the foregoing method for obtaining a key, and the same technical effect can be achieved. When the communication device 700 is a network side device, the program or instruction, when being executed by the processor 701, implements each process in the embodiments of the foregoing method for obtaining a key, and the same technical effect can be achieved. To avoid repetition, details are not described herein again.

Figure 8:
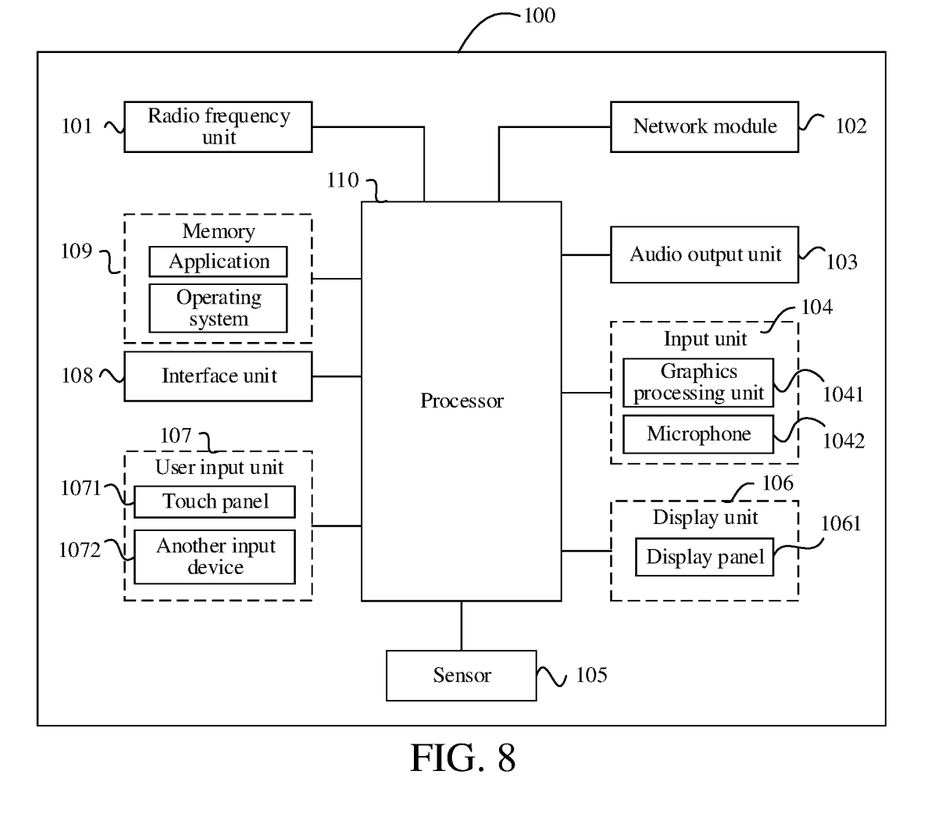
FIG. 8 is a schematic diagram of a hardware structure of a terminal according to an embodiment of the present application.

FIG. 8 is a schematic diagram of a hardware structure of a terminal according to an embodiment of the present application.

The terminal 100 includes, but is not limited to, components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the terminal 100 may further include a power supply (such as a battery) for supplying power to the components. The power supply may be logically connected to the processor 110 by a power management system, thereby implementing functions such as charging discharging, and power consumption management by using the power management system. A person skilled in the art may understand that the terminal structure shown in FIG. 8 does not constitute a limitation on the terminal, and the terminal may include more or fewer components than shown, or combine some components, or have different component arrangements. Details are not described herein again.

It should be understood that in the embodiments of the present application, the input unit 104 may include a graphics processing unit (GPU) 1041 and a microphone 1042. The graphics processing unit 1041 performs processing on image data of a static picture or a video that is obtained by an image acquisition device (for example, a camera) in a video acquisition mode or an image acquisition mode. The display unit 106 may include a display panel 1061. The display panel 1061 may be configured in the form of a liquid crystal display, an organic light-emitting diode, or the like. The user input unit 107 includes a touch panel 1071 and another input device 1072. The touch panel 1071 may be referred to as a touch screen. The touch panel 1071 may include two parts: a touch detection apparatus and a touch controller. The another input device 1072 may include, but not limited to, a physical keyboard, a functional key (such as a volume control key or a switch key), a track ball, a mouse, and a joystick, which are not described herein in detail.

In the embodiments of the present application, the radio frequency unit 101 receives downlink data from a network side device, and then delivers the downlink data to the processor 110 for processing; and in addition, sends uplink data to the network side device. Generally, the radio frequency unit 101 includes, but is not limited to, an antenna, at least one amplifier, a transceiver, a coupler, a low noise amplifier, a duplexer, and the like.

The memory 109 may be configured to store a software program or an instruction and various data. The memory 109 may mainly include a program storage or instruction area and a data storage area. The program storage or instruction area may store an operating system, an application or instruction required by at least one function (for example, a sound playback function and an image display function), and the like. In addition, the memory 109 may include a high speed random access memory, and may further include a non-volatile memory. The non-volatile memory may be a read-only memory, ROM), a programmable ROM, PROM), an erasable programmable read-only memory, EPROM), an electrically EPROM, EEPROM), or a flash memory, and is, for example, at least one magnetic disk storage device, a flash memory or another non-volatile solid-state storage device.

The processor 110 may include one or more processing units. Optionally, the processor 110 may integrate an application processor and a modem processor. The application processor mainly processes an operating system, a user interface, an application, instructions, or the like. The modem processor mainly processes wireless communication, and is, for example, a baseband processor. It may be understood that, the modem processor may alternatively not be integrated in the processor 110.

The radio frequency unit 101 is configured to send first key information to a network side device, where the first key information is used for indicating a first key of second UE, and the first key is used for performing encryption and/or integrity protection on data in communication between the second UE and the network side device.

Optionally, the processor 110 is configured to obtain all or a portion of information of the first key of the second UE from the second UE.

Optionally, the first key information includes: all or a portion of information of the first key of the second UE; or all or a portion of information of the first key of the second UE and a UE identity of the second UE.

Optionally, the processor 110 is further configured to calculate the first key of the second UE according to target information and an input parameter. The target information includes first information or a security key of the first UE. The first information is a same parameter or a related parameter stored in the first UE and the second UE; the security key of the first UE includes a first subkey and a second subkey; the first subkey is a key related to a first access network element; and the second subkey is a key related to a second access network element. The input parameter includes at least one of the following: a target parameter, a PCI of a cell in which the second UE is located, frequency information of a cell in which the second UE is located, or device information of the second UE; and the target parameter includes at least one of the following: a counter, a random number, or a sequence.

Optionally, in a case that the target information is the first information, the first key information includes at least one of the following: the first key, the input parameter, a UE identity of the second UE, or the first information; or in a case that the target information is the security key, the first key information includes at least one of the following: the first key, the input parameter, the UE identity of the second UE, or first instruction information; and the first instruction information is used for instructing to use the security key of the first UE to generate the first key of the second UE.

Optionally, the radio frequency unit 101 is configured to receive a key request from the second UE, where the key request is used for requesting to use a second key of the first UE to perform encryption and/or integrity protection on data in communication between the second UE and the network side device; the second key includes a first subkey and a second subkey; and the first subkey is a key related to a first access network element, and the second subkey is a key related to a second access network element. The processor 110 is configured to use the second key as the first key of the second UE according to the key request.

Optionally, the first key information includes at least one of the following: second instruction information, or a UE identity of the second UE, and the second instruction information is used for instructing to use the security key of the first UE to perform encryption and/or integrity protection on data in communication between the second UE and the network side device.

Optionally, the radio frequency unit 101 is further configured to receive a proxy request from the second UE, where the proxy request is used for requesting proxy for a security process of the second UE; and the radio frequency unit 101 is further configured to send a proxy response to the second UE, where the proxy response is used for instructing the first UE to accept proxy for the security process of the second UE.

Optionally, the radio frequency unit 101 is further configured to send second information, where the second information is used for indicating that the first UE has a capability of proxy for a security process of another UE.

Optionally, the radio frequency unit 101 is further configured to: in a case that a first condition is met, send second key information to the network side device or the second UE, where the second key information is used for indicating an updated first key.

Optionally, the first condition includes at least one of the following: that the first key of the second UE is changed, or that information used for calculating the first key of the second UE is changed.

Optionally, the radio frequency unit 101 is further configured to send the first key to the second UE.

In the UE provided in the embodiments of the present application, to ensure encryption and/or integrity protection of data and/or signaling transmitted over an air interface, the UE relies on first UE to report a security key of second UE to a network side device, so that the UE can use the security key to perform encryption and/or integrity protection on data in communication between the second UE and the network side device, thereby effectively ensuring the reliability of communication between the second UE and the network side device.

The radio frequency unit 101 is configured to send a proxy request to first UE. The radio frequency unit 101 is further configured to: if a proxy response fed back by the first UE is received, send target key information to the first UE. The proxy request is used for requesting proxy for a security process of the second UE. The proxy response is used for instructing the first UE to accept proxy for the security process of the second UE. The target key information is used for indicating the first key. The first key is used for performing encryption and/or integrity protection on data in communication between the second UE and the network side device.

Optionally, the target key information includes all or a portion of information of the first key, or a key request. The key request is used for requesting to use a second key of the first UE to perform encryption and/or integrity protection on data in communication between the second UE and the network side device; the second key includes a first subkey and a second subkey; and the first subkey is a key related to a first access network element, and the second subkey is a key related to a second access network element.

The radio frequency unit 101 is further configured to receive second information from the first UE, where the second information is used for indicating that the first UE has a capability of proxy for a security process of another UE.

Optionally, the radio frequency unit 101 is further configured to: in a case that a first condition is met, send third key information to a network side device and/or the first UE, where the third key information is used for indicating an updated first key.

Optionally, the first condition includes at least one of the following: that the first key of the second UE is changed, or that information used for calculating the first key of the second UE is changed.

Optionally, the radio frequency unit 101 is further configured to receive first key information, from the first UE, where the first key information is used for indicating the first key of the second UE.

Optionally, the radio frequency unit 101 is further configured to receive third information from the network side device, where the third information is used for activating a security state of the second UE and/or confirming a security key of the second UE. The radio frequency unit 101 is further configured to feed back response information to the network side device, where the response information is used for indicating that an uplink security state of the second UE is activated.

In the UE provided in the embodiments of the present application, to ensure encryption and/or integrity protection of data and/or signaling transmitted over an air interface, the UE sends a proxy request to second UE to request to rely on first UE to report a security key of the second UE to a network side device, so that the UE can use the security key to perform encryption and/or integrity protection on data in communication between the second UE and the network side device, thereby effectively ensuring the reliability of communication between the second UE and the network side device.

Figure 9:
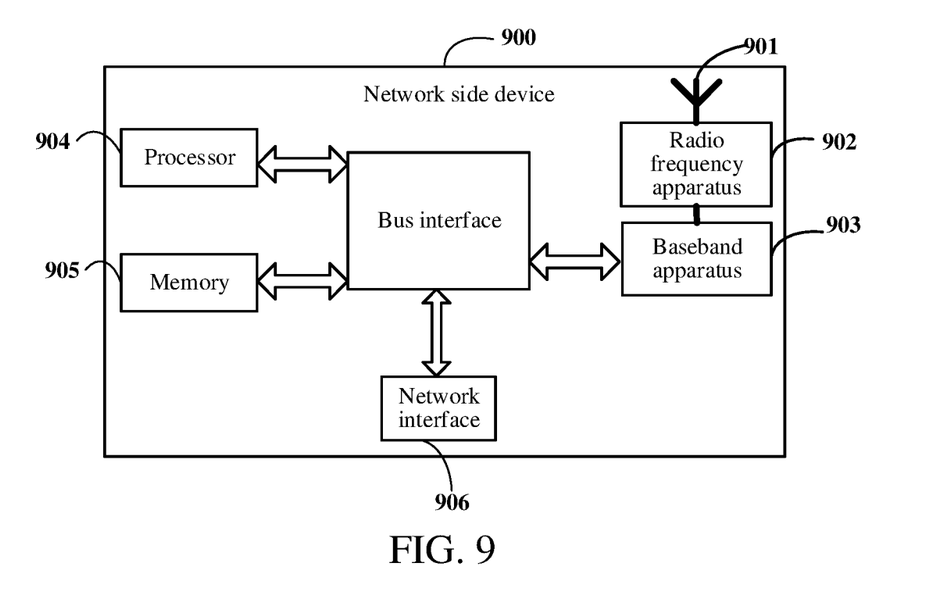
FIG. 9 is a schematic diagram of a hardware structure of a network side device according to an embodiment of the present application.

Illustratively, the embodiments of the present application further provide a network side device. As shown in FIG. 9, the network side device 900 includes an antenna 901, a radio frequency apparatus 902, and a baseband apparatus 903. The antenna 901 is connected to the radio frequency apparatus 902. In an uplink direction, the radio frequency apparatus 902 receives information by using the antenna 901, and sends the received information to the baseband apparatus 903 for processing. In a downlink direction, the baseband apparatus 903 processes information to be sent, and sends the information to the radio frequency apparatus 902. The radio frequency apparatus 902 processes the received information and sends the information by using the antenna 901.

A band processing apparatus may be located in the baseband apparatus 903. The method performed by the network side device in the foregoing embodiments may be implemented in the baseband apparatus 903. The baseband apparatus 903 includes a processor 904 and a memory 905.

The baseband apparatus 903 may include, for example, at least one baseband plate. A plurality of chips are disposed on the baseband plate. As shown in FIG. 9, one of the plurality of chips is, for example, the processor 904, and is connected to the memory 905, to invoke a program in the memory 905 to perform operations of the network side device in the foregoing method embodiment.

The baseband apparatus 903 may further include a network interface 906, configured to exchange information with the radio frequency apparatus 902. The interface is, for example, a common public radio interface (CPRI).

Illustratively, the network side device in the embodiments of the present application further include: an instruction or a program stored in the memory 905 and executable on the processor 904. The processor 904 invokes the instruction or program in the memory 905 to perform the method performed by the module shown in FIG. 6 and achieves the same technical effect. To avoid repetition, details are not described herein again.

The embodiments of the present application further provide a non-transitory readable storage medium. The non-transitory readable storage medium stores a program or an instruction. The program or instruction, when being executed by a processor, implements each process of the foregoing embodiments of the method for obtaining a key, and the same technical effect can be achieved. To avoid repetition, details are not described herein again.

The processor is a processor in the terminal in the foregoing embodiments. The non-transitory readable storage medium includes a non-transitory computer-readable storage medium, for example, a computer read-only memory (ROM), a random access memory (RAM), a magnetic disk, an optical disc, or the like.

The embodiments of the present application further provide a chip. The chip includes a processor and a communication interface. The communication interface is coupled to the processor are. The processor is configured to execute a program or an instruction of a network side device to implement various processes in the embodiments of the method for obtaining a key, and can achieve the same technical effect. To avoid repetition, details are described again.

It should be noted that, the chip mentioned in the embodiments of the present application may also be referred to as a system-level chip, a system chip, a chip system, a system on chip, or the like.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one . . . " does not exclude that there are still other same elements in the processes, methods, objects, or apparatuses. Further, it needs to be noted that the scope of the methods and apparatuses in the embodiments of the present application is not limited to performing the functions in the order shown or discussed, but may also include performing the functions in a substantially simultaneous manner or in the reverse order depending on the functions involved. For example, the described methods may be performed in a different order than described, and various steps may also be added, omitted, or combined. In addition, features described with reference to some examples may be combined in other examples.

Through the descriptions of the foregoing implementations, a person skilled in the art may clearly understand that the methods in the foregoing embodiments may be implemented through software and a necessary general hardware platform, and certainly, may also be implemented by hardware, but in many cases, the former manner is a better implementation. Based on such an understanding, the technical solutions of the present application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network side device, or the like) to perform the foregoing methods described in the embodiments of the present application.

The embodiments of the present application are described above with reference to the accompanying drawings. However, APPLICATIONS application is not limited to the foregoing Illustrative implementations. The foregoing Illustrative implementations are illustrative instead of limitative. Enlightened by the present application, a person of ordinary skill in the APPLICATIONS make many forms without departing from the idea of the present application and the scope of protection of the claims. All of the forms fall within the protection of the present application.

What is claimed is:

1. A method for obtaining a key, comprising:
   sending, by a first user equipment (UE), first key information to a network side device; wherein
   the first key information is used for indicating a first key of a second UE, and the first key of the second UE is used for performing encryption and/or integrity protection on data in communication between the second UE and the network side device; wherein
   before sending, by the first UE, the first key information to the network side device, the method further comprises:

calculating, by the first UE, the first key of the second UE according to target information and an input parameter; wherein the target information comprises first information or a security key of the first UE;

the first information is a same parameter or a related parameter stored in the first UE and the second UE; the security key of the first UE comprises a first subkey and a second subkey; the first subkey is a key related to a first access network element; and the second subkey is a key related to a second access network element; and the input parameter comprises at least one of following: a target parameter, a physical cell identifier (PCI) of a cell in which the second UE is located, frequency information of a cell in which the second UE is located, or device information of the second UE; and the target parameter comprises at least one of following: a counter, a random number, or a sequence; and/or before sending, by the first UE, the first key information to the network side device, the method further comprises:

receiving, by the first UE, a key request from the second UE; wherein the key request is used for requesting to use a security key of the first UE to perform encryption and/or integrity protection on data in communication between the second UE and the network side device; the security key comprises a first subkey and a second subkey; and the first subkey is a key related to a first access network element, and the second subkey is a key related to a second access network element; and using, by the first UE, the security key of the first UE as the first key of the second UE according to the key request.

2. The method according to claim 1, wherein before sending, by the first UE, the first key information to the network side device, the method further comprises:

obtaining, by the first UE, all or a portion of information of the first key of the second UE from the second UE.

3. The method according to claim 2, wherein the first key information comprises all or a portion of information of the first key of the second UE; or all or a portion of information of the first key of the second UE and a UE identity of the second UE.

4. The method according to claim 1, wherein in a case that the target information is the first information, the first key information comprises at least one of following: the first key, the input parameter, a UE identity of the second UE, or the first information; or in a case that the target information is the security key of the first UE, the first key information comprises at least one of following: the first key, the input parameter, the UE identity of the second UE, or first instruction information; and the first instruction information is used for instructing to use the security key of the first UE to generate the first key of the second UE.

5. The method according to claim 1, wherein before sending, by the first UE, the first key information to the network side device, the method further comprises:

receiving, by the first UE, a proxy request from the second UE; wherein the proxy request is used for requesting proxy for a security process of the second UE; and sending, by the first UE, a proxy response to the second UE; wherein the proxy response is used for instructing the first UE to accept proxy for the security process of the second UE.

6. The method according to claim 5, wherein before receiving, by the first UE, the proxy request from the second UE, the method further comprises:

sending, by the first UE, second information; wherein the second information is used for indicating that the first UE has a capability of proxy for a security process of another UE.

7. The method according to claim 1, wherein after sending, by the first UE, the first key information to the network side device, the method further comprises:

in a case that the first UE meets a first condition, sending second key information to the network side device or the second UE; wherein the second key information is used for indicating an updated first key of the second UE; and/or the first condition comprises at least one of following: that the first key of the second UE is changed, or that information used for calculating the first key of the second UE is changed.

8. The method according to claim 1, wherein after sending, by the first UE, the first key information to the network side device, the method further comprises:

sending, by the first UE, the first key of the second UE to the second UE.

9. A user equipment (UE), comprising a processor, a memory, and a program or an instruction stored in the memory and executable on the processor, wherein the program or instruction, when being executed by the processor, implements steps of the method for obtaining a key according to claim 1.

10. A method for obtaining a key, comprising:

sending, by second UE, a proxy request to a first UE; and if the second UE receives a proxy response fed back by the first UE, sending target key information to the first UE; wherein the proxy request is used for requesting proxy for a security process of the second UE;

the proxy response is used for instructing the first UE to accept proxy for the security process of the second UE; and the target key information is used for indicating a first key of the second UE; and the first key of the second UE is used for performing encryption and/or integrity protection on data in communication between the second UE and the network side device; wherein the target key information comprises a key request, wherein the key request is used for requesting to use a security key of the first UE to perform encryption and/or integrity protection on data in communication between the second UE and the network side device; the security key comprises a first subkey and a second subkey; and the first subkey is a key related to a first access network element, and the second subkey is a key related to a second access network element; and the key request is used for requesting to use the security key of the first UE as the first key of the second UE.

11. The method according to claim 10, wherein before sending, by the second UE, the proxy request to the first UE, the method further comprises:

receiving, by the second UE, second information from the first UE; wherein the second information is used for indicating that the first UE has a capability of proxy for a security process of another UE.

12. The method according to claim 10, wherein after the second UE sends the target key information of the second UE to the first UE, the method further comprises:
- in a case that the second UE meets a first condition, sending third key information to the network side device and/or the first UE; wherein
- the third key information is used for indicating an updated first key of the second UE; and/or
- the first condition comprises at least one of following: that the first key of the second UE is changed, or that information used for calculating the first key of the second UE is changed.

13. The method according to claim 10, wherein the method further comprises:
- receiving, by the second UE, first key information from the first UE, wherein the first key information is used for indicating the first key of the second UE; or
- receiving, by the second UE, third information from the network side device; wherein
- the third information is used for activating a security state of the second UE and/or confirming a security key of the second UE; and
- feeding back, by the second UE, response information to the network side device; wherein
- the response information is used for indicating that an uplink security state of the second UE is activated.

14. A user equipment (UE), comprising a processor, a memory, and a program or an instruction stored in the memory and executable on the processor, wherein the program or instruction, when being executed by the processor, implements steps of the method for obtaining a key according to claim 10.

* * * * *